US011140429B1

(12) United States Patent
Johnson et al.

(10) Patent No.: US 11,140,429 B1
(45) Date of Patent: Oct. 5, 2021

(54) DYNAMIC STATMUX VIDEO BANDWIDTH DETERMINATION

(71) Applicant: Amazon Technologies, Inc., Seattle, WA (US)

(72) Inventors: Erik Jason Johnson, St. Helens, OR (US); Trevor Wells, Washougal, WA (US); Ai Luo, Camas, WA (US); John Bach, Roswell, GA (US); Ryan Hegar, Happy Valley, OR (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 16/712,757

(22) Filed: Dec. 12, 2019

(51) Int. Cl.
| | |
|---|---|
| *H04N 21/2662* | (2011.01) |
| *H04N 21/2665* | (2011.01) |
| *H04N 21/2362* | (2011.01) |
| *H04N 21/24* | (2011.01) |
| *H04N 21/462* | (2011.01) |
| *H04N 21/44* | (2011.01) |

(52) U.S. Cl.
CPC ..... *H04N 21/2662* (2013.01); *H04N 21/2362* (2013.01); *H04N 21/2402* (2013.01); *H04N 21/2665* (2013.01); *H04N 21/44004* (2013.01); *H04N 21/4621* (2013.01); *H04N 21/4622* (2013.01)

(58) Field of Classification Search
None
See application file for complete search history.

(56) References Cited

U.S. PATENT DOCUMENTS

2017/0034589 A1* 2/2017 Rozenberg ......... H04N 21/6583
2017/0085616 A1* 3/2017 Botsford ................ H04L 67/02

* cited by examiner

Primary Examiner — Omar S Parra
(74) Attorney, Agent, or Firm — NDWE, LLP (57) ABSTRACT

Techniques for dynamic video bandwidth determination are described. An exemplary method includes receiving an indication of a desired total bitrate for a multiple program transport stream (MPTS), the MPTS having at least two programs; receiving non-video content from two or more encoders; buffering video content during a determination of available video bandwidth; and determining an amount of the desired total bitrate to be the available video bandwidth by: for each active encoder, determining a non-video bitrate over a first time period for each encoder using a sliding window based on a statistical measurement, summing the determined non-video bitrates for the active encoders to get a total non-video bitrate, subtracting the total non-video bitrate from the desired total bitrate to get an available video bandwidth, and allocating the available video bandwidth amongst the two or more encoders.

20 Claims, 9 Drawing Sheets

| TIME | 0 | 1 | 2 | ... | 58 | 59 |
|---|---|---|---|---|---|---|
| VALUE | 100 | 96 | 89 | ... | 78 | 45 |

PROGRAM SLIDING WINDOW BITRATE TRACKER
(FIRST EPOCH)
601

| TIME | 0 | 1 | 2 | ... | 58 | 59 |
|---|---|---|---|---|---|---|
| VALUE | 96 | 89 | 88 | ... | 45 | 75 |

PROGRAM SLIDING WINDOW BITRATE TRACKER
(SECOND EPOCH)
603

DYNAMIC STATMUX VIDEO BANDWIDTH DETERMINATION

BACKGROUND

A statistical multiplexer (statmux) controls a bitrate at which a set of encoders encode video to maximize video quality while ensuring the statmux can multiplex the multiple programs (each containing audio, video, and data), program specific information (PSI) and/or Digital Video Broadcasting (DVB) service information (SI) tables, and null packets into a constant bitrate (CBR) multiple program transport stream (MPTS).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for providing dynamic statistical multiplexing video bandwidth. One of the challenges to optimizing video quality in a statmux is the accurate determination of the bitrate available for video. That can be particularly challenging when the bandwidth of the non-video elements (such as teletext data) vary over time. Detailed herein are embodiments that determine the available bandwidth available for video data over time. Each video encoder is then allocated a portion of that video bandwidth.

Prior to describing the determination of video bitrate, it should be noted that a statmux should not allocate too many bits to video such that the MPTS cannot maintain its constant bitrate (CBR) property, packets are dropped, or an elementary stream has packets that are scheduled into the MPTS later than allowed (e.g., a non-compliant stream where the arrival time of the last packet of a video frame, audio frame, or data is later than its decode timestamp). As such, the video bandwidth determination detailed herein determines how much bandwidth is available to video without over-estimating it.

In some prior systems, statmux implementations required a user to configure the video bitrate separate from the overall transport stream bitrate. That approach was unsatisfactory because it put the burden of determining the available video bitrate on the user and it was not able to adapt to changes in the available video bitrate over time (e.g., as teletext or other data comes and goes). The user was forced to configure the video bitrate for the minimum video bitrate that would be available during the lifetime of the statmux.

In some embodiments, the non-video payload is measured under the assumption that most of the time the past is a good predictor of the future. The non-video payload being multiplexed into the statmux output is measured in defined intervals (e.g., one second) and a maximum amount those one second measurements across a 60 second sliding window. The available video bitrate is the total CBR of the multiplex minus the maximum measured non-video payload in the last minute (where non-video payload also includes a measurement of the overhead needed to encapsulate the video elementary stream into the MPTS).

In some embodiments, lookahead buffers are used to delay the video encoder such that the statmux dynamic video pool bitrate determinator can make video bitrate allocation decisions based on information that includes data on a rolling window of the next time period of video frames. This can help prevent MPTS output overflow. Since the video pipeline is delayed relative to the audio and data pipelines, that offers the opportunity for the system to measure the bitrate of those audio and data elements that will eventually be passed to the statmux. That data can then be passed to the statmux dynamic video pool bitrate determinator for inclusion in the video bandwidth determination before any decisions have been made for the corresponding video frames.

Figure 1:
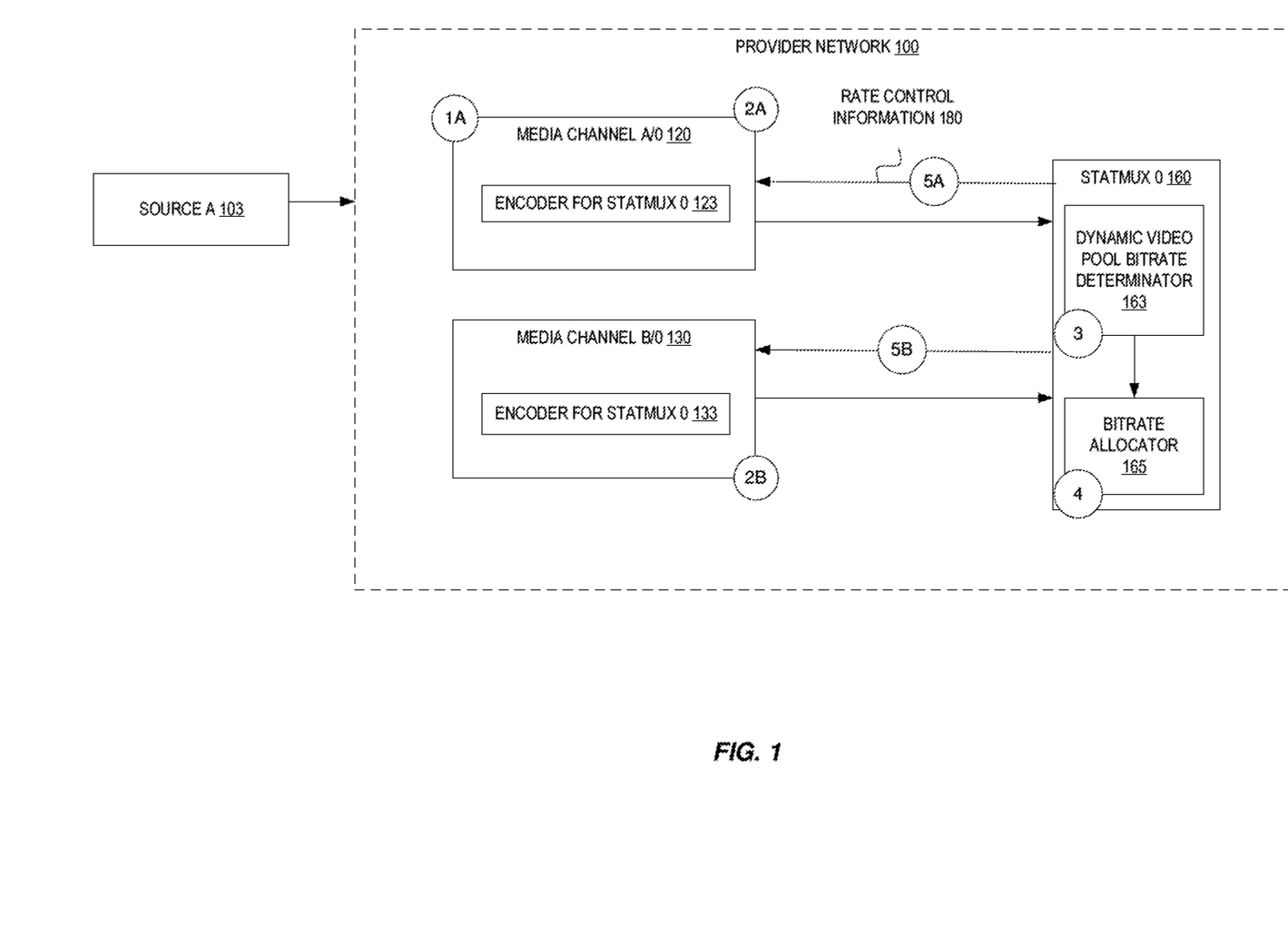
FIG. 1 illustrates embodiments of statmuxing of media channels and providing dynamic video rate control information to the media channels.

FIG. 1 illustrates embodiments of statmuxing of media channels and providing dynamic video rate control information to the media channels. In this example, there is an upstream source (source A 103). Examples of an upstream source include, but are not limited to: a streaming camera or appliance that is directly connected to the internet, a contribution encoder that is located in remote location, etc. The content from source A 102 is in a specific package format and protocol. For example, the source content might be available as HTTP Live Streaming (HLS) or transport streaming (TS). The source content contains video, audio, and optional captions streams that are in specific codecs or formats.

One or more media channels (media channel A/0 120 and media channel B/0 130) ingest and transcode content from upstream source A 102 and package an output which contains a specific combination of elementary stream encodes (video, audio, and data such as captions). Each channel 120, 130 has at least one encoder (shown as encoders 123, and 133,) to generate that combination of encodes as a program. Each encoder of a channel also generates and provides complexity information (for example, as a complexity packet) for each frame to each statmux. For example, complexity packets may contain a sequence number, encoder identifier, start and end timestamps for the associated frame, and/or a complexity score. This information is used in the statmux 160 for clock recovery, bitrate allocation, and interleaving. Note that in some embodiments, a program is packetized into packetized elementary streams (PESs) using a transport stream packet format which includes a payload and a header (including a sync byte) describing how to process the payload, identify the stream to which the packet belongs (using a packet identifier (PID)), scrambling control bits, adaption field control, and a continuity counter value.

Based at least in part on the program generated by each media channel 120, 130, the bitrate allocator 165 of the statmux 160 will generate and send rate control information back to every encoder that indicates how to encode each video frame (e.g., the bitrate, etc.). This rate control information is based at least in part by an output of the dynamic video pool bitrate determinator 163. The dynamic video pool bitrate determinator 163 measures the non-video payload from each encoder and subtracts that from the total CBR of the multiplex minus the maximum measured non-video payload over a period of time to determine a dynamic size for the video payload. Note that the rate control information may include a sequence number, encoder identifier, start and end timestamps (matching the complexity packet), a priority field, and a bitrate allocation for the associated frame. In some embodiments, the rate control information includes an indication of whether that encoder should be active or inactive.

The receiving encoder within a channel prioritizes rate control information using the priority field in each rate control information packet. For any given frame, the encoder in a channel accepts the highest priority rate control information response that arrives in time. In some embodiments, the priority field will be used as follows: a highest priority is assigned to bitrate response packets from the primary statmux to an active channel; a second highest priority is assigned to bitrate response packets from the secondary multiplex to an active channel; a third highest priority is assigned to bitrate response packets from the primary multiplex to an inactive channel; and a lowest priority is assigned to bitrate response packets from the secondary multiplex to an inactive channel In some embodiments, an additional indication is provided with the rate control information to indicate whether a channel should suppress its output to a statmux.

In some embodiments, a provider network 100 is utilized. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The numbers with circles in them illustrate an exemplary flow of providing rate control information to encoders. At circle 1A, source A 102 transmits content to both channels 120 and 130.

The channels 120 and 130 encode the received content at circles 2A-2B and send the encoded content including video, audio, and data (one or more programs) to the statmux 160.

At circle 3, the statmux 160 determines a video pool bitrate (also called a video bandwidth bitrate) which is an amount of data to be spread across all of the video encoders of the channels 120 and 130. The bitrate allocator 165 takes in this video pool bitrate and determines how much video bandwidth to allocate to each encoder. The statmux 160 then sends rate control information back to the media channels 120 and 130 that includes an indication of the amount of video bandwidth allocated to a particular encoder.

Figure 2:
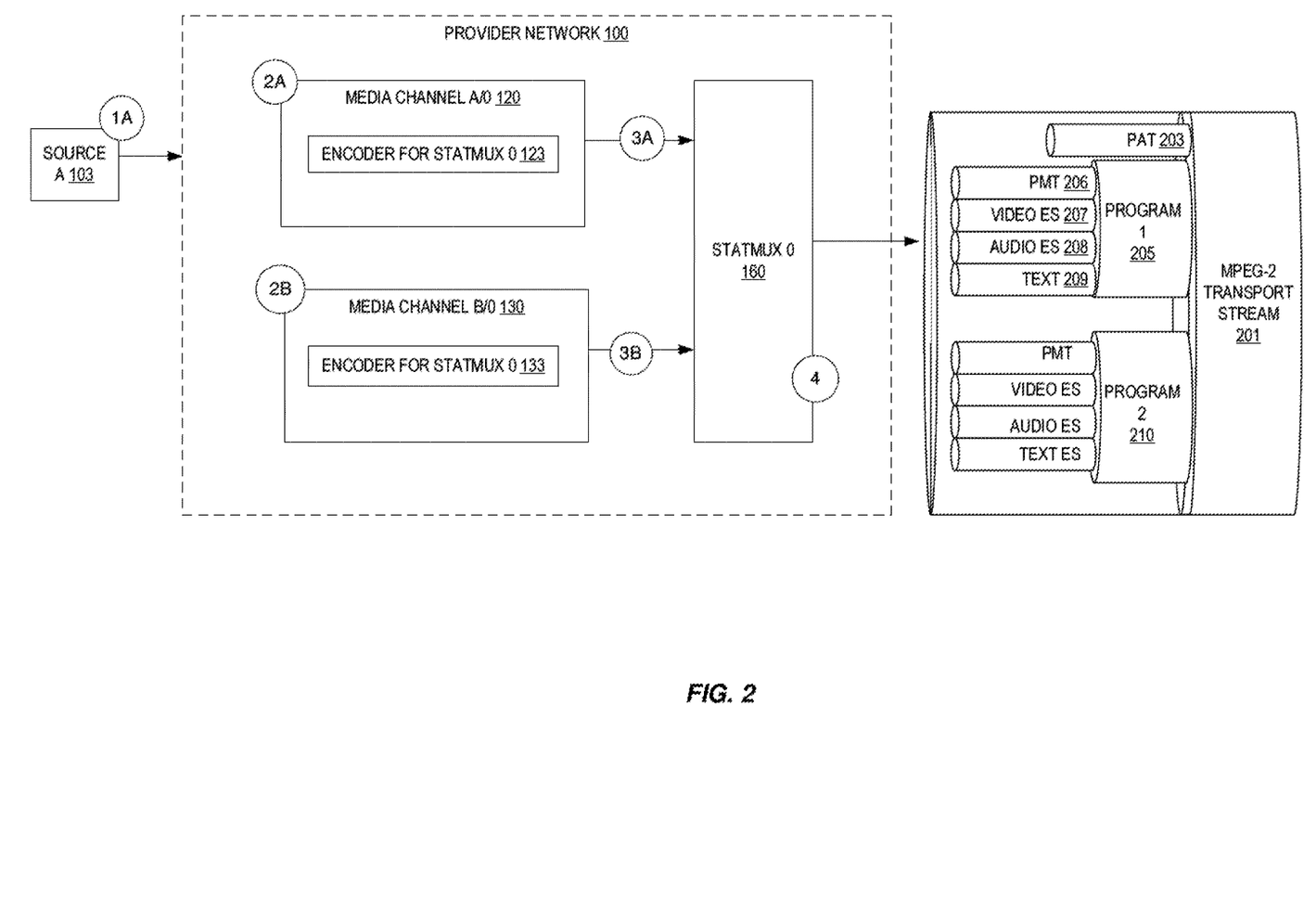
FIG. 2 illustrates embodiments of generating a MPTS.

FIG. 2 illustrates embodiments of generating a MPTS. This illustration shows media content being provided by source A 103 at circle 1A to the media channels 120 and 130. The media channels 120 and 130 then encode the media content and generate programs at circles 2A and 2B. Note the amount of bandwidth to dedicate to video has been provided to the video encoders for each of the media channels.

In some embodiments, audio is muxed into the channel output using a frame buffer model. This means that the bits are spread evenly for a given frame duration and the scheduling deadline is based on a presentation time stamp. Captions, subtitles, and metadata are scheduled immediately.

The programs are output at circles 3A and 3B to the statmux 0 160. The statmux 160 then generates and outputs a MPTS from the programs at circle 4. Note that a MPTS is a multiplexed data stream of one or more programs, where each program has one or more elementary streams such as audio, video, etc. As part of the multiplexed data stream, the MPEG-2 transport 201 stream includes a program association table (PAT) 203 that includes information about the programs 205 and 210 included within the MPEG-2 transport stream 201. In some embodiments, a program includes a program map table (PMT) 206 that includes identifying information of the elementary streams included within the program. The program includes a video elementary stream 207 and a metadata elementary stream. The program may further include an audio elementary stream 208 and/or data (such as a subtitle or captions elementary stream) 209. When the statmux 160 receives a program map table (PMT) from the channel, it is able to determine which PID is associated with the video stream and all of the other PIDs for the elementary stream data should be assumed to be the non-video data.

To facilitate synchronization of the video elementary stream, the metadata elementary streams, and any other available streams that are part of the program 205 and 210, the programs 205 and 210 include a clock reference (CR) and the multiplexed components of the program (video, metadata, audio, etc.) include timing information to indicate when the component should be rendered to the user. The CR can be used to initialize and synchronize the decoders of the various elementary streams to their encoded rate, and the timing information can be used by the decoders to ensure that each decoder renders output (e.g., display of video, playback of audio, display of metadata or visual information based on metadata, etc.) in time with other decoders (e.g., displaying metadata associated with a frame at the same time the frame is displayed).

Figure 3:
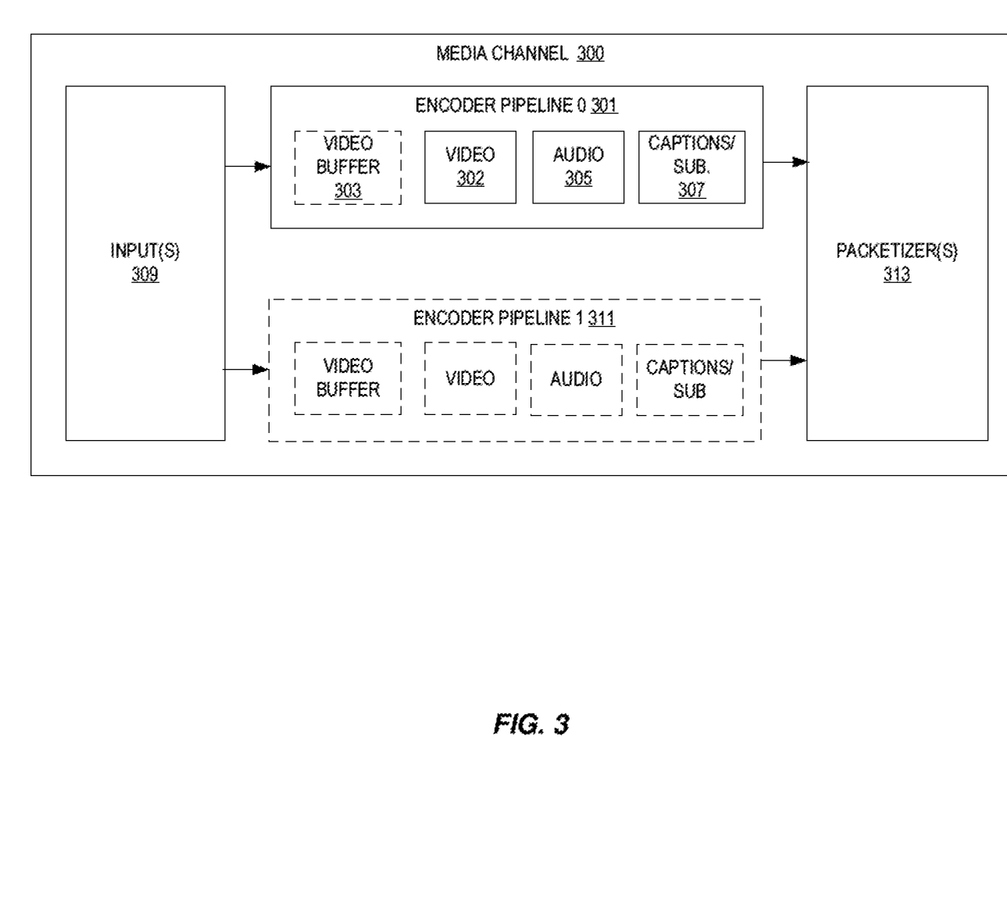
FIG. 3 illustrates embodiments of a media channel.

FIG. 3 illustrates embodiments of a media channel In this example, the media channel 300 includes one or more inputs 309 that contain information about how the upstream system and the channel 300 connect to each other. The connection between the input 309 and the upstream system might be a push (the upstream system pushes the content) or a pull (the channel 300 pulls the content from the upstream system).

In this example, there are two encoder pipelines 301 and 311. Each encoder pipeline includes a video encoder 302, an audio encoder 305, and data (e.g., captions, subtitles, etc.) encoder 307. The output of these encoders is packetized as a program using one or more packetizers 313. Note that there may be a packetizer per encoder pipeline or a shared packetizer.

In some embodiments, each encoder pipeline 301 and 311 also includes lookahead video buffers 303 which delay the operation of the video encoder 302. As noted above, this delay allows for the statmux dynamic video pool bitrate determinator 163 to make video bitrate allocation decisions based on information that includes data on a rolling window of the next time period of video frames. This can help prevent MPTS output overflow. Since the video pipeline is delayed relative to the audio and data pipelines, that offers the opportunity for the system to measure the bitrate of those audio and data elements that will eventually be passed to the statmux and pass that data to the statmux dynamic video pool bitrate determinator 163 for inclusion in the video bandwidth determination before any decisions have been made for the corresponding video frames by the bitrate allocator 165.

Figure 4:
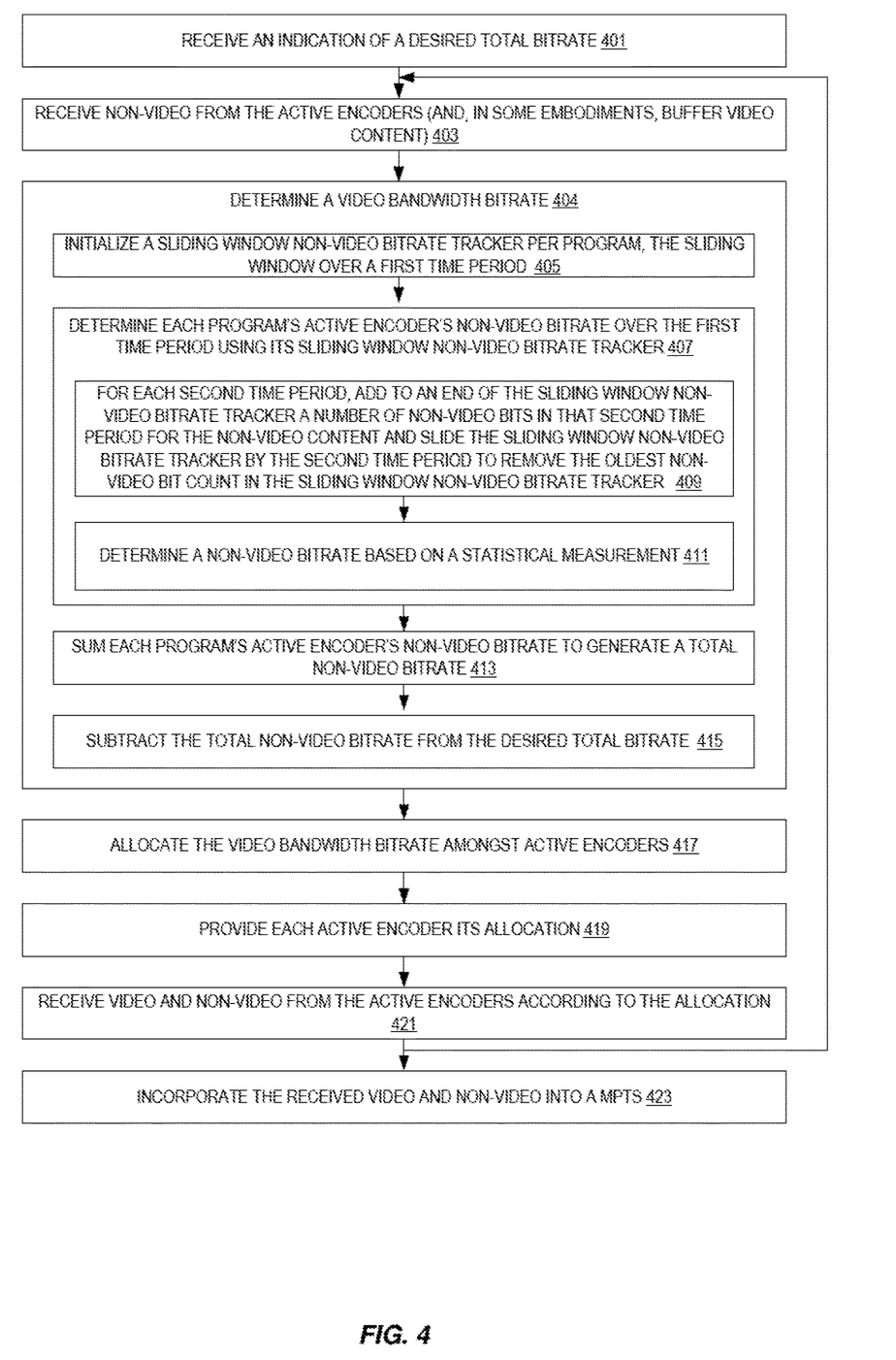
FIG. 4 is a flow diagram illustrating operations of a method for using a statistical multiplexer to at least determine a video bandwidth according to some embodiments.

FIG. 4 is a flow diagram illustrating operations of a method for using a statistical multiplexer to at least determine a video bandwidth according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the statmuxes of the other figures.

At 401, an indication of a desired total bitrate for a MPTS is received. For example, a CBR value is provided. This total bitrate represents that total amount of bits per second for all program content, etc. for a MPTS.

Non-video content from encoders is received at 403. Non-video content can be identified from the packet identifiers (PIDs) of the packetized streams. Note that in some embodiments, as discussed above, video content is buffered in the channels such that video does not outpace the audio, etc. Additionally, in some embodiments, non-video content include video content overhead.

A video bandwidth bitrate at a given point in time is determined using the non-video content at 404. This determination may have several actions. In general, this determination counts the number of bits for non-video PIDs for some number of seconds to generate up with a fixed bitrate number. Seconds may be based on the program clock reference (PCR) of any adaptation field of the incoming packet headers.

In some embodiments, a sliding window non-video bitrate tracker per program is initialized at 405. The sliding window covers a first time period (such as a minute). The sliding window non-video bitrate trackers contain a plurality of entries with each entry containing a number of non-video bits received over a second time period (such as a second). In some embodiments, this initialization value is 1 Mb such that the initial epoch has 1 Mb allocated to it.

Each program's active encoder's non-video bitrate is determined over the first time period using its sliding window non-video bitrate tracker at 407. In some embodiments, this determination includes for each second time period, adding to an end of the sliding window non-video bitrate tracker a number of non-video bits in that second time period and sliding the sliding window non-video bitrate tracker by the second time period to remove the oldest non-video bits in the sliding window non-video bitrate tracker at 409.

At 411, a determinization of a non-video bitrate for the sliding window is made based on a statistical measurement. In some embodiments, the non-video bitrate is the maximum value in the sliding window. In other embodiments, the non-video bit rate is one of an average, a median, a standard deviation, etc.

Each program's active encoder's non-video bitrate is then summed to generate a total non-video bitrate at 413. For example, the sum of the non-video bit rates of the encoders of FIGS. 1 and 2 is calculated.

At 415, the total non-video bitrate is subtracted from the desired total bitrate to get a point in time (e.g., dynamic) video bandwidth bitrate. This provides, at a given point in time, the total amount of bandwidth (bits) that can be dedicated to video.

The bandwidth bitrate is allocated amongst active encoders at 417. Note that in some embodiments, not all encoders of the channels are "active" and thereby producing content that is to be included in the MPTS. Dashed lines for encodes in FIGS. 1 and 2 show non-active encoders.

Each active encoder is provided with its video allocation at 419. For example, rate control information provided by statmux 160 includes this allocation.

At 421, video and non-video streams from the active encoders is received according to the allocation. In other words, the video elementary streams are encoded at a bitrate consistent with their allocation from the video bandwidth bitrate.

The received video and non-video streams are incorporated into a MPTS at 423. The processes of receiving non-video streams, etc. repeats until there is no more content to incorporate into the MPTS.

Figure 5:
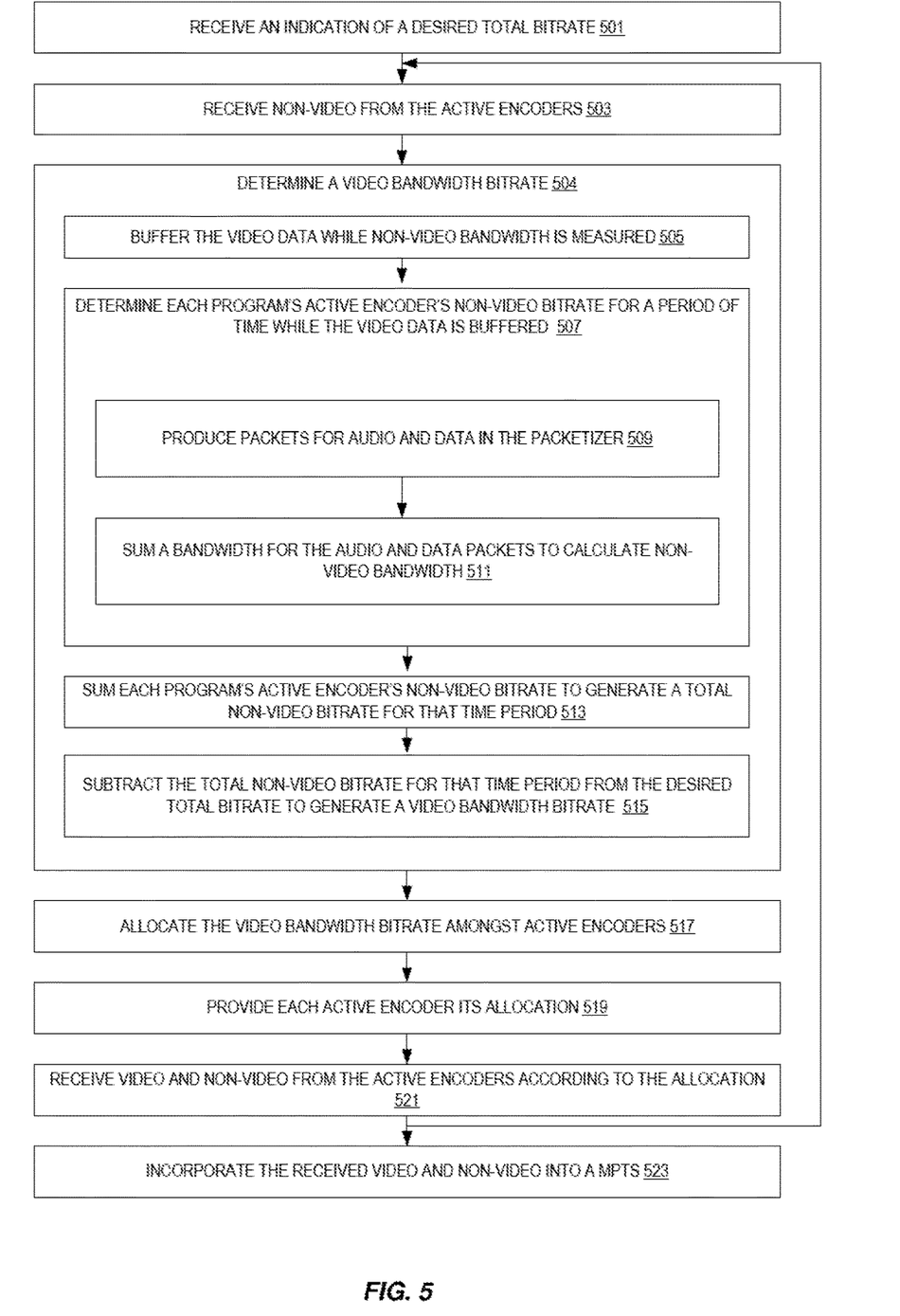
FIG. 5 is a flow diagram illustrating operations of a method for using a statistical multiplexer to at least determine a video bandwidth according to some embodiments.

FIG. 5 is a flow diagram illustrating operations of a method for using a statistical multiplexer to at least determine a video bandwidth according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the statmuxes of the other figures.

At 501, an indication of a desired total bitrate for a MPTS is received. For example, a CBR value is provided. This total bitrate represents that total amount of bits per second for all program content, etc. for a MPTS.

Non-video content from encoders is received at 503. Non-video content can be identified from the packet identifiers (PIDs) of the packetized streams. Additionally, in some embodiments, non-video content includes video content overhead.

A video bandwidth bitrate is determined at 504. This determination may have several actions. In general, this determination counts the number of bits for non-video PIDs for some number of seconds to generate up with a fixed bitrate number. Seconds may be based on the program clock reference (PCR) of any adaptation field of the incoming packet headers.

Video data is buffered in the channels at 505. In some embodiments, this buffering includes the buffering of frame data.

A determination of each program's active encoder's non-video bitrate for a period of time while the video data is buffered is made at 507. This may include one or more actions. At 509, packets for audio and data (such as captions, etc.) are produced in the packetizer.

Each encoder's non-video bandwidth is calculated by summing the bandwidth of audio and data of the generated audio and data packets at 511. In some embodiments, the non-video bandwidth includes video overhead or an estimate thereof, the PAT, PMT, etc.

Each program's active encoder's non-video bitrate is then summed to generate a total non-video bitrate at 413. For example, the sum of the non-video bit rates of the encoders of FIGS. 1 and 2 is calculated.

At 515, the total non-video bitrate for that time period is subtracted from the desired total bitrate to generate a video bandwidth bitrate.

The bandwidth bitrate is allocated amongst active encoders at 517. Note that in some embodiments, not all encoders of the channels are "active" and thereby producing content that is to be included in the MPTS.

Each active encoder is provided with its video allocation at 519. For example, rate control information provided by statmux 160 includes this allocation.

At 521, video and non-video streams from the active encoders is received according to the allocation. In other words, the video elementary streams are encoded at a bitrate consistent with their allocation from the video bandwidth bitrate.

The received video and non-video streams are incorporated into a MPTS at 523. The processes of receiving non-video streams, etc. repeats until there is no more content to incorporate into the MPTS.

Figure 6:
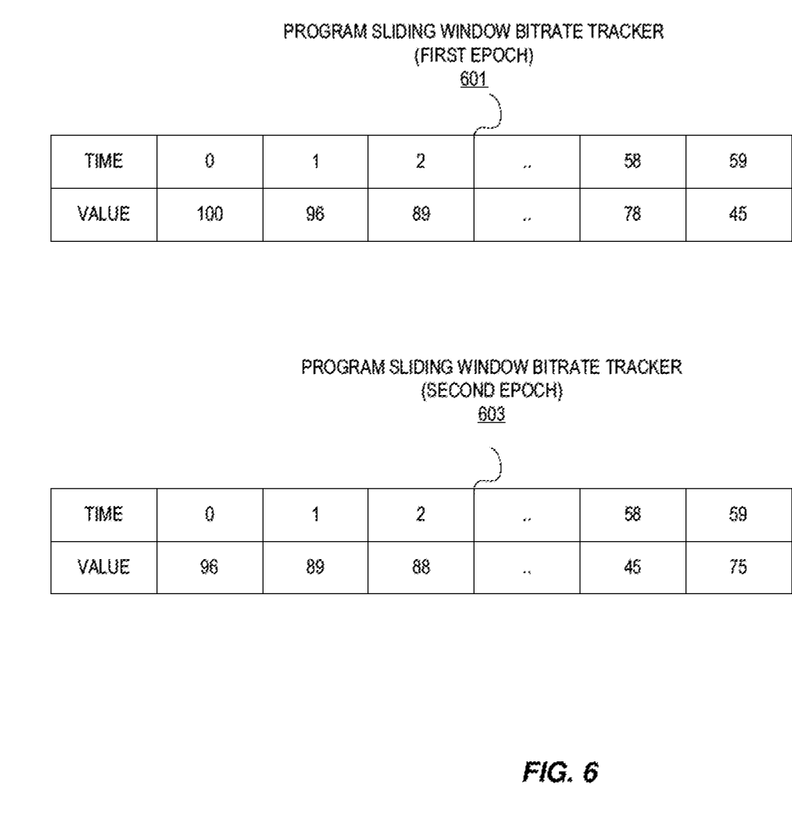
FIG. 6 illustrates examples of embodiments of a program sliding window over time.

FIG. 6 illustrates examples of embodiments of a program sliding window over time. In this example, the program sliding window has a length of 60 seconds and 60 one second slots. Each slot holds a value for a count of non-video bits at a particular point in time.

A program sliding window bitrate tracker of a first epoch 601 is shown. Note that at time 0 there were 100 non-video bits and at the latest point in time in the epoch there were 45 non-video bits. The sum of all of the values is the program's active encoder non-video bitrate.

A program sliding window bitrate tracker of a second epoch 603 shows the removal of the oldest value (in this case 100) from the first epoch and replacing it with the second oldest value from the first epoch, etc.

Figure 7:
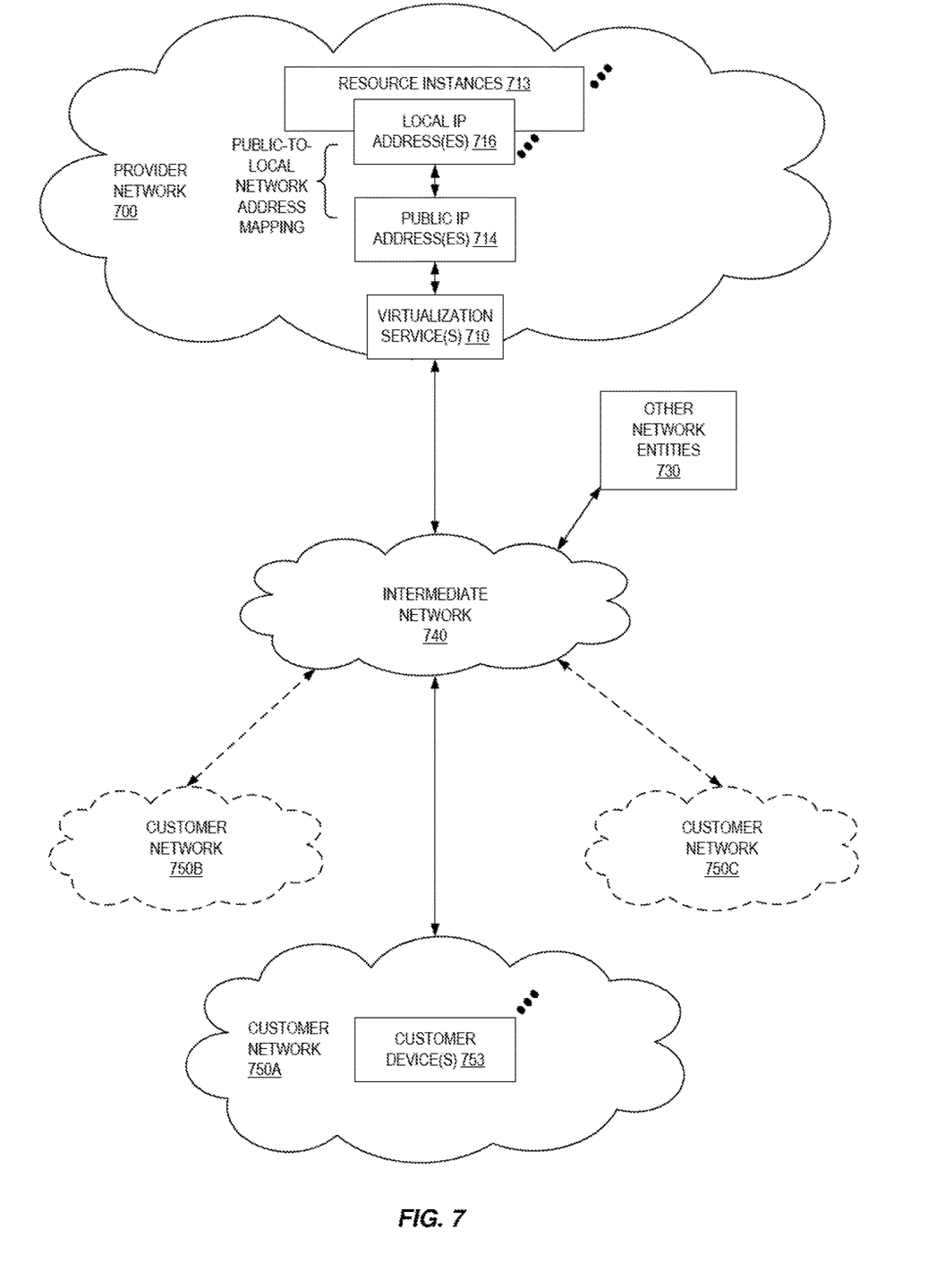
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
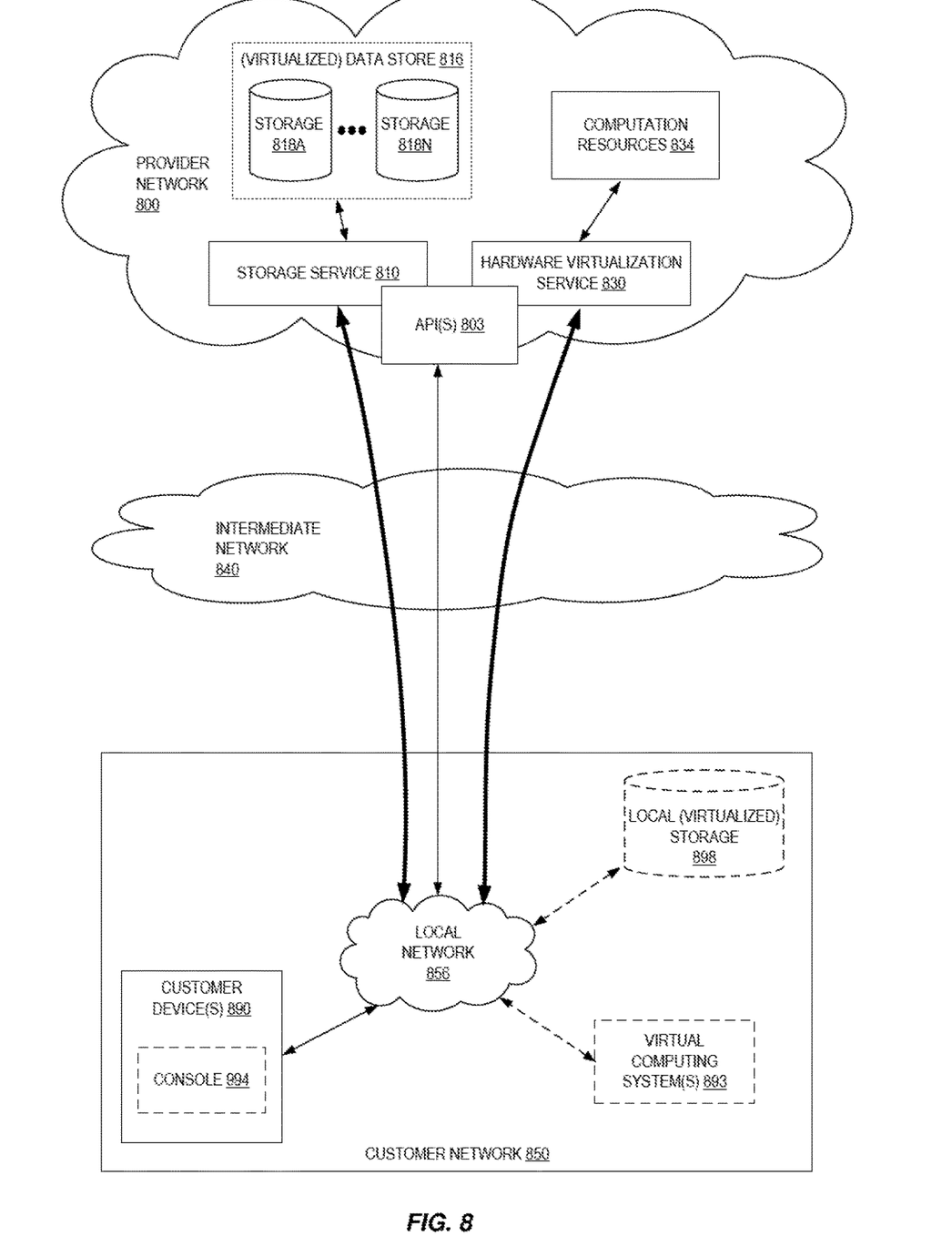
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
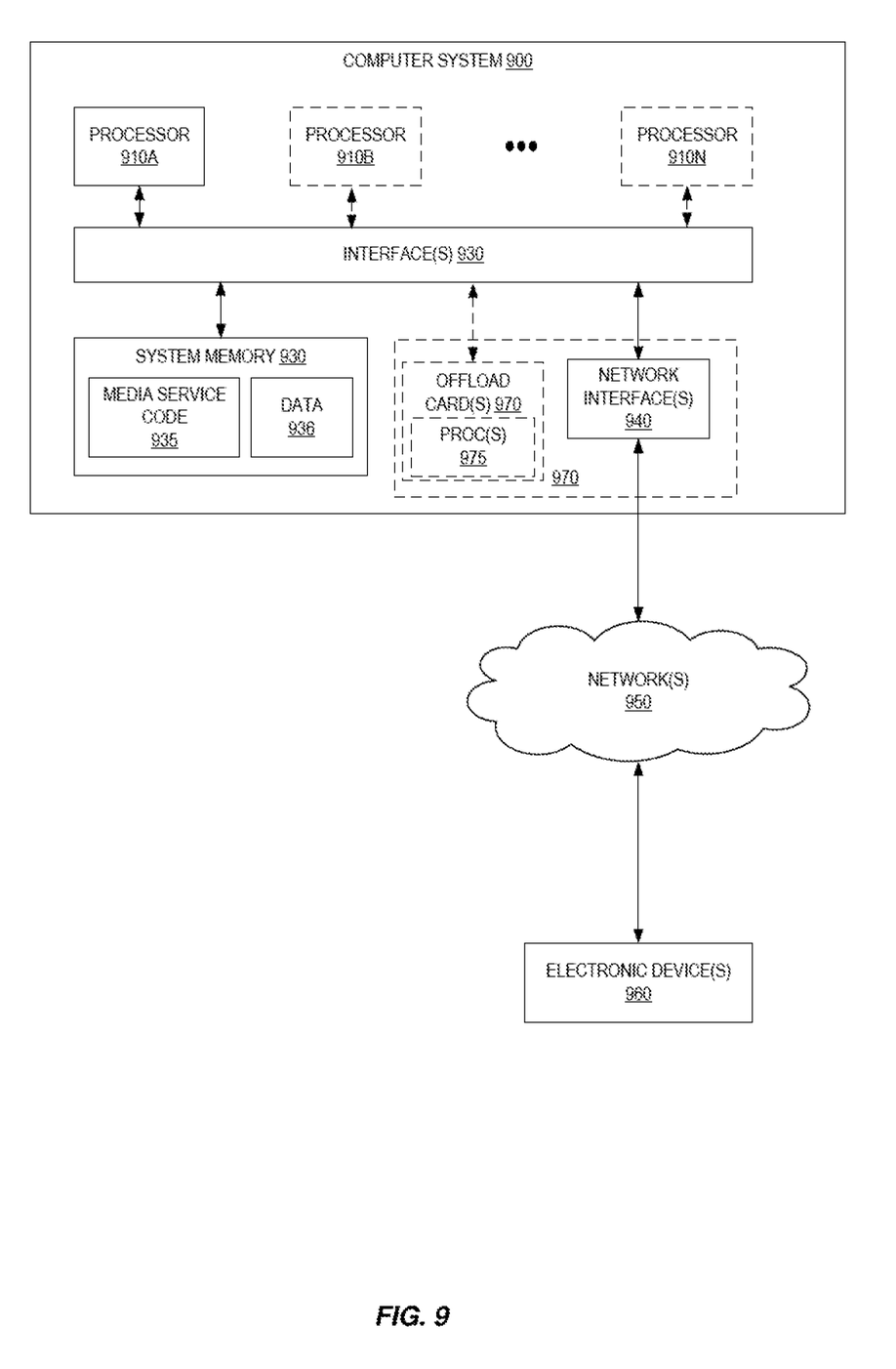
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as media service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving an indication of a desired total bitrate for a multiple program transport stream (MPTS), the MPTS having at least two programs;
   receiving non-video content from two or more encoders; and
   determining an amount of the desired total bitrate to dedicate to video content by:
      initializing a sliding window non-video bitrate tracker per program of the MPTS, the sliding window over a first time period,
      for each active encoder,
         determining a non-video bitrate over the first time period for each encoder over the first time period using the sliding window non-video bitrate tracker by:
            for each second time period, adding to an end of the sliding window non-video bitrate tracker a number of non-video bits in that second time period for the non-video content and sliding the sliding window non-video bitrate tracker by the second time period to remove an oldest non-video bits count in the sliding window non-video bitrate tracker, and
            choosing a maximum number of non-video bits in the sliding window non-video bitrate tracker to generate the non-video bitrate for the active encoder,
      summing the generated non-video bitrates for the active encoders to get a total non-video bitrate,
      subtracting the total non-video bitrate from the desired total bitrate to get an available video bandwidth, and
      allocating the available video bandwidth amongst the two or more encoders.

2. The computer-implemented method of claim 1, further comprising:
   buffering video content during the determination of the available video bandwidth.

3. The computer-implemented method of claim 1, wherein the non-video content comprises encoded audio and encoded text data.

4. A computer-implemented method comprising:
   receiving an indication of a desired total bitrate for a multiple program transport stream (MPTS), the MPTS having at least two programs;
   receiving non-video content from two or more encoders;
   buffering video content during a determination of available video bandwidth; and
   determining an amount of the desired total bitrate to be the available video bandwidth by:
      for each active encoder,
         determining a non-video bitrate over a first time period for each encoder using a sliding window based on a statistical measurement,
      summing the determined non-video bitrates for the active encoders to get a total non-video bitrate,
      subtracting the total non-video bitrate from the desired total bitrate to get an available video bandwidth, and
      allocating the available video bandwidth amongst the two or more encoders.

5. The computer-implemented method of claim 4, wherein the non-video bitrate includes video overhead data.

6. The computer-implemented method of claim 4, further comprising:
   initializing the sliding window per program of the MPTS with a set total value.

7. The computer-implemented method of claim 4, wherein a time period is one minute and the sliding window is to track 60 consecutive one-second time periods.

8. The computer-implemented method of claim 4, wherein the sliding window is an array.

9. The computer-implemented method of claim 4, wherein the non-video content comprises encoded audio and encoded text data.

10. The computer-implemented method of claim 9, wherein each program contains video content and the non-video content.

11. The computer-implemented method of claim 4, wherein encoders that are not active do not factor into the determination of the available video bandwidth.

12. The computer-implemented method of claim 4, wherein a packet identifier (PID) is used to at least partially distinguish between video content and non-video content.

13. The computer-implemented method of claim 4, wherein the first time period is calculated using program clock references.

14. The computer-implemented method of claim 4, wherein allocating the available video bandwidth amongst the two or more encoders includes transmitting rate control information that includes a sequence number, encoder identifier, start and end timestamps, and a bitrate allocation for an associated frame.

15. A system comprising:
    storage for audio/visual files implemented by a first one or more electronic devices; and
    a media service implemented by a second one or more electronic devices, the media service including instructions that upon execution cause the media service to:
       receive an indication of a desired total bitrate for a multiple program transport stream (MPTS), the MPTS having at least two programs;
       receive non-video content from two or more encoders;
       buffer video content during a determination of available video bandwidth; and
       determine an amount of the desired total bitrate to be the available video bandwidth to:
          for each active encoder,
             determine a non-video bitrate over a first time period for each encoder using a sliding window based on a statistical measurement,
          sum the determined non-video bitrates for the active encoders to get a total non-video bitrate,
          subtract the total non-video bitrate from the desired total bitrate to get an available video bandwidth, and allocate the available video bandwidth amongst the two or more encoders.

16. The system of claim 15, wherein the first time period is calculated using program clock references.

17. The system of claim 15, wherein the sliding window is an array.

18. The system of claim 15, wherein the non-video content comprises encoded audio and encoded text data.

19. The system of claim 15, wherein a packet identifier (PID) is used to at least partially distinguish between video content and non-video content.

20. The system of claim 15, wherein to allocate the available video bandwidth amongst the two or more encoders includes to transmit rate control information that includes a sequence number, encoder identifier, start and end timestamps, and a bitrate allocation for an associated frame.

* * * * *